(12) United States Patent
Sim et al.

(10) Patent No.: US 6,904,754 B2
(45) Date of Patent: Jun. 14, 2005

(54) STEAM GENERATOR FOR LIQUID METAL REACTOR AND HEAT TRANSFER METHOD THEREOF

(75) Inventors: Yoon Sub Sim, Daejeon (KR); Seong-O Kim, Daejeon (KR); Eui Kwang Kim, Daejeon (KR); Do Hee Hahn, Daejeon (KR); Myung Hwan Wi, Daejeon (KR)

(73) Assignees: Korea Atomic Energy Research Institute (KR); Korea Hydro & Nuclear Power Co., Ltd. (KR)

( * ) Notice: Subject to any disclaimer, the term of this patent is extended or adjusted under 35 U.S.C. 154(b) by 2 days.

(21) Appl. No.: 10/422,208

(22) Filed: Apr. 24, 2003

(65) Prior Publication Data

US 2004/0182081 A1 Sep. 23, 2004

(30) Foreign Application Priority Data

Mar. 17, 2003 (KR) .............................. 10-2003-0016568

(51) Int. Cl.[7] .............................................. F01K 25/00
(52) U.S. Cl. .......................................... 60/671; 60/670
(58) Field of Search ................................... 60/670, 671

(56) References Cited

U.S. PATENT DOCUMENTS

| | | | | |
|---|---|---|---|---|
| 4,048,012 A | * | 9/1977 | George et al. .............. | 376/298 |
| 4,087,985 A | * | 5/1978 | Cohen et al. ............... | 376/402 |
| 4,099,385 A | * | 7/1978 | Silvestri, Jr. ................ | 60/678 |
| 4,387,577 A | * | 6/1983 | Campbell .................... | 60/680 |
| 4,737,337 A | * | 4/1988 | Garabedian et al. ........ | 376/299 |
| 4,753,576 A | * | 6/1988 | Slepian ........................ | 417/50 |
| 4,842,054 A | * | 6/1989 | Nathenson et al. .... | 165/104.28 |

OTHER PUBLICATIONS

Korean Nuclear Society, "Evaluation of New Concepts for Liquid Metal Reactor," Abstracts of Proceedings of Korean Nuclear Society Autumn Meeting, Oct. 2002 pp. 1–15.

* cited by examiner

*Primary Examiner*—Hoang Nguyen
(74) *Attorney, Agent, or Firm*—Cantor Colburn LLP

(57) ABSTRACT

Disclosed herein is a steam generator for a liquid metal reactor and a heat transfer method thereof, and more particularly a steam generator for a liquid metal reactor having intermediate fluid forcibly circulated therein and structurally improved coiled heat transfer tubes installed therein, and a heat transfer method of such a steam generator, whereby an accident of the sodium-water reaction is practically prevented and heat transfer efficiency is improved.

The heat transfer method of the steam generator for the liquid metal reactor including a reactor core, a steam generator, and a turbine, utilizes forced circulation for the intermediate fluid in the steam generator. The forced circulation is carried out through a flow channel defined in the steam generator, which forms a closed flow circuit for the intermediate fluid, by means of operation of a circulation pump installed in the flow channel.

By the provision of the heat transfer method of the present invention characterized by intermediate fluid forcibly circulated therein and structurally improved coiled heat transfer tubes installed therein, an accident of the sodium-water reaction is practically prevented and heat transfer efficiency is improved. Furthermore, the steam generator is easily installed inside a containment dome, and an intermediate heat transport system and a mitigating system against a sodium-water reaction accident are eliminated from the liquid metal reactor.

9 Claims, 11 Drawing Sheets

STEAM GENERATOR FOR LIQUID METAL REACTOR AND HEAT TRANSFER METHOD THEREOF

BACKGROUND OF THE INVENTION

1. Field of the Invention

The present invention relates to a steam generator for a liquid metal reactor and a heat transfer method thereof, and more particularly to a steam generator for a liquid metal reactor having three different fluids with forced circulation and an improved tube bundle configuration therein, and a heat transfer method of such a steam generator, whereby the sodium-water reaction accident is prevented while sodium is still used as the primary coolant and heat transfer efficiency is improved.

2. Description of the Related Art

A liquid metal reactor is a nuclear reactor which generates heat using fast neutrons for nuclear reaction. The liquid metal reactor uses liquid metal, not water, as a coolant.

An example of such a conventional liquid metal reactor is schematically shown in FIG. 9.

In the liquid metal reactor as shown in FIG. 9, sodium, which is a coolant, is heated as it passes through a reactor core 100. The heated sodium is circulated through a sodium-circulating piping 101. At this time, heat is transferred from the heated sodium to water in a steam generator 300. The resulting steam operates a turbine 400.

If a heat transfer tube in the steam generator 300 leaks, the water from the leakage inevitably comes to react with sodium violently. In order to prevent such an accident of the sodium-water reaction, an intermediate heat transport system composed of intermediate heat exchangers 200 and intermediate heat piping 201 is provided between the primary heat transport system of the sodium-circulating piping 101 and the steam generation system of the water-circulating piping 301.

Consequently, a first heat transfer is accomplished from the sodium circulated through the sodium-circulating piping 101, which is heated as it passes through the reactor core 100, to the sodium circulated through the intermediate heat piping 201 in the intermediate heat exchanger 200. Subsequently, a second heat transfer is accomplished from the sodium circulated through the intermediate heat piping 201 to water circulated through the water-circulating piping 301 in the steam generator 300. The resulting steam operates the turbine 400.

As described above, the conventional liquid metal reactor includes the aforesaid intermediate heat transport system to protect the reactor core from an accident of the violent chemical reaction of water and sodium when a tube in the steam generator 300 leaks water. Nevertheless, the possibility of the accident of the sodium-water reaction still exists. Besides, the installation of the intermediate heat transport system increases the construction cost of a liquid metal reactor plant.

In order to solve the aforesaid problems, another conventional liquid metal reactor having a simple structure has been proposed. An example of the conventional liquid metal reactor is schematically shown in FIG. 10.

As shown in FIG. 10, the liquid metal reactor comprises: a high temperature piping 101 through which heated liquid metal is circulated, the high temperature piping 101 communicating with a reactor core 100; coiled high temperature heat transfer tubes 102 connected between one end of the high temperature piping 101 and the other end of the high temperature piping 101; a low temperature piping 301 through which water is circulated, the low temperature piping 301 communicating with a turbine 300; coiled low temperature heat transfer tubes 302 connected between one end of the low temperature piping 301 and the other end of the low temperature piping 301; and a steam generator 200 having a container 201 in which the coiled high temperature heat transfer tubes 102 and the coiled low temperature heat transfer tubes 302 are installed. An intermediate heat transfer fluid 202 is filled in the container 201.

In the liquid metal reactor constructed as mentioned above, heat transfer from the high temperature fluid flowing inside the tubes 102 to the low temperature fluid flowing inside the tubes 302 in the container 210 of the steam generator 200 is accomplished by heating the intermediate heat transfer fluid 202 by the high temperature fluid in the tubes 102 and naturally circulating the intermediate heat transfer fluid 202.

A fluid chemically stable to both water and sodium is used for the intermediate heat transfer fluid 202.

The aforesaid liquid metal reactor naturally circulates the intermediate heat transfer fluid 202 and is supposed to achieve the required heat transfer without the possibility of the accident of the sodium-water reaction by using the intermediate heat transfer fluid 202 which is chemically stable to both water and sodium.

Although the accident possibility is removed, the aforesaid natural circulation does not provide sufficient heat transfer performance and its heat transfer efficiency becomes remarkably low.

The heat transfer area of the steam generator must be sufficiently increased to prevent the aforesaid reduction of the heat transfer efficiency, and thus to obtain desired heat transfer efficiency. In this case, the size of the steam generator is impractically increased, which leads to an increase of the cost of manufacturing the steam generator.

Increasing the size of the steam generator inevitably involves increasing the size of a containment dome, in which the steam generator is installed.

In conclusion, operation of the liquid metal reactor using the natural circulation type steam generator without the previously mentioned intermediate heat transport system becomes impractical.

SUMMARY OF THE INVENTION

Therefore, the present invention has been made in view of the above problems, and it is an object of the present invention to provide a steam generator for a liquid metal reactor which is capable of preventing occurrence of the accident of the sodium-water reaction and eliminating the need of using an intermediate heat transport system, and a heat transfer method of such a steam generator.

In accordance with the present invention, the above and other objects can be accomplished by the provision of a steam generator for a liquid metal reactor comprising a reactor core, a steam generator, and a turbine, wherein intermediate fluid is circulated by forced circulation in the steam generator, and a heat transfer method thereof.

Preferably, the forced circulation can be carried out through a flow channel defined at the center of the steam generator, the flow channel forming a closed flow circuit for the intermediate fluid, by means of operation of a circulation pump installed in the flow channel.

The steam generator according to the present invention comprises: a bundle of heat transfer tubes for the high temperature fluid of sodium heated by the reactor core; a bundle of heat transfer tubes for the low temperature fluid of water and steam; and a container for accommodating the foresaid tube bundles. An intermediate fluid which works as the agent achieving heat transfer from the hot fluid to the cold fluid is filled in the container.

Using the heat transfer method according to the present invention, the intermediate fluid is forcibly circulated in the steam generator with the afore-stated construction, whereby the efficiency of heat transfer between the intermediate fluid and the tubes is improved, and thus the heat transfer efficiency of the steam generator is improved.

If the heat transfer efficiency of the steam generator is increased, the steam generator can be manufactured in a realistic size, and the need for the expensive intermediate heat transport system and mitigation system for the sodium-water reaction accident are eliminated.

The flow channel for the intermediate fluid is defined in the steam generator, and the circulation pump is installed in the flow channel. The forced circulation of the intermediate fluid is carried out by means of the circulation pump.

According to the present invention, the possibility of an accident of the violent sodium-water reaction is practically removed since a fluid which is chemically stable to both of water and sodium is used for the intermediate fluid, and heat transfer efficiency of the steam generator is improved since the intermediate fluid is circulated by forced circulation.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
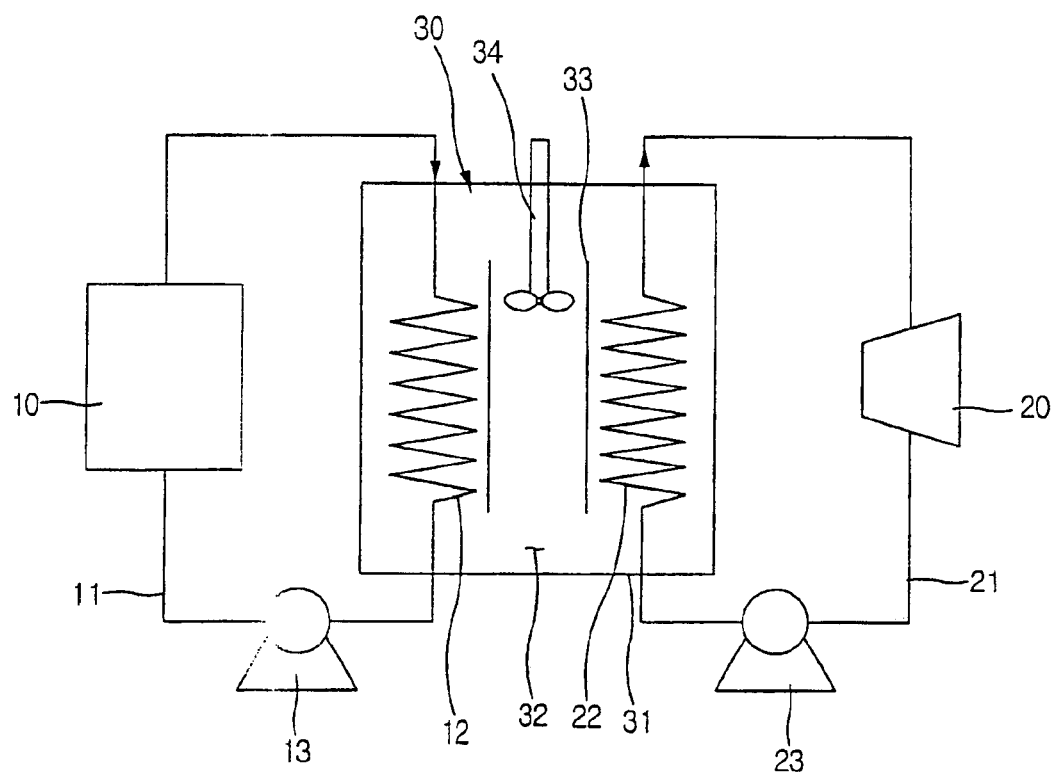
FIG. 1 is a schematic diagram of a liquid metal reactor of the present invention.

FIG. 1 is a schematic diagram of a liquid metal reactor of the present invention.

As shown in FIG. 1, liquid metal, for example sodium, heated by a reactor core 10, is circulated through a high temperature piping 11. At this time, the heated liquid metal passes through coiled high temperature heat transfer tubes 12 installed in a container 31 of a steam generator 30. On the other hand, water passing through a turbine 20 is circulated through a low temperature piping 21. At this time, the water passes through coiled low temperature heat transfer tubes 22 installed in the container 31 of the steam generator 30.

While the liquid metal and the water passes through the heat transfer tubes 12 and 22 as mentioned above, the intermediate fluid 32 is forcibly circulated through a flow channel 33 defined in the container 31 of the steam generator 30 by means of operation of a circulation pump 34 installed in the flow channel 33. Consequently, the efficiency of heat transfer between the intermediate fluid 32 and the heat transfer tubes 12 and 22 is improved, and thus the heat transfer efficiency of the steam generator 30 is improved.

The intermediate fluid 32 is made of liquid metal, such as lead, which is chemically stable to both of water and sodium. Consequently, the possibility of an accident of the sodium-water reaction is practically prevented even when any of the heat transfer tubes 12 and 22 leaks liquid metal or water.

As described in detail above, the steam generator 30 practically prevents an accident of the sodium-water reaction while the heat transfer efficiency of the steam generator 30 is improved by the aforesaid forced circulation of the intermediate fluid 32. The steam generator 30 is manufactured in an appropriate size sufficient to be accommodated in an existing containment dome. Furthermore, the reactor core 10 can be protected without the provision of an intermediate heat transport system.

Figure 2:
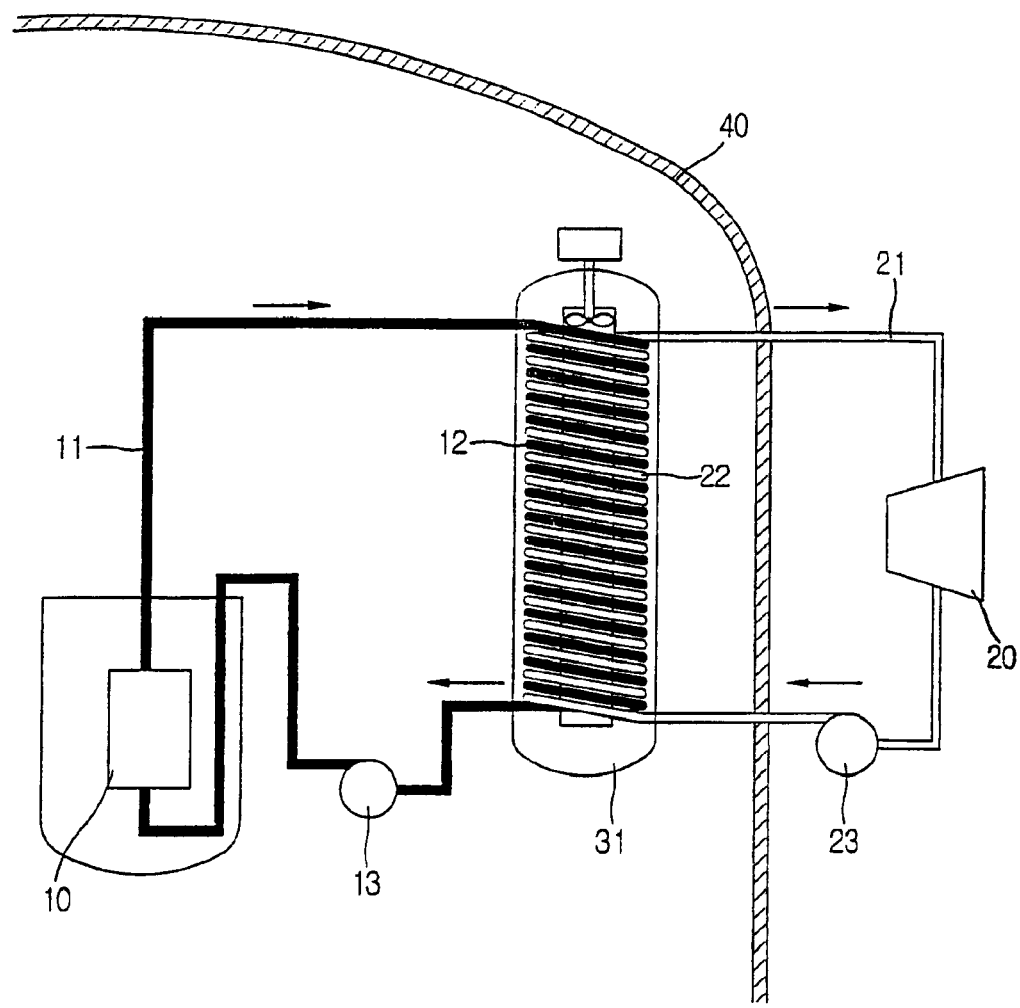
FIG. 2 is a longitudinal sectional view of a liquid metal reactor equipped with a steam generator according to a first preferred embodiment of the present invention.

A liquid metal reactor equipped with a steam generator according to a first preferred embodiment of the present invention is shown in FIG. 2.

Inside a containment dome 40 of the liquid metal reactor are installed a reactor core 10 and a steam generator 30. Outside the containment dome 40 is installed a turbine 20 connected to the steam generator 30 via piping.

The liquid metal reactor with the above-stated construction is operated as follows: liquid metal, i.e., sodium heated in the reactor core 10 leaves the reactor core 10, flows through the high temperature piping 11, passes through the coiled high temperature heat transfer tubes 12 installed in the container 31 of the steam generator 30, and enters the reactor core 10. Such circulation is driven by means of a pump 13 installed in the high temperature piping 11.

On the other hand, water flows through the low temperature piping 21 connected to the turbine 20 in such a manner that the low temperature piping 21 communicates with the turbine 20, passes through the coiled low temperature heat transfer tubes 22 also installed in the container 31 of the steam generator 30, and enters the turbine 20. Such circulation is driven by means of a feed pump 23 installed in the low temperature piping 21. During the circulation, the water is changed into steam in the steam generator 30. The resulting steam is used to operate the turbine 20.

Prevention of an accident of the sodium-water reaction and provision of the steam generator 30 of an appropriate size must be accomplished in order to accommodate the steam generator 30 in the containment dome 40. The accident of the sodium-water reaction is practically prevented by filling the intermediate fluid, such as lead, in the container 31 of the steam generator 30. The steam generator 30 can be constructed with an appropriate size if the heat transfer efficiency of the steam generator 30 is increased.

The construction and the operation of the steam generator with improved heat transfer efficiency according to the present invention will now be described in detail with reference to FIG. 3.

Figure 3:
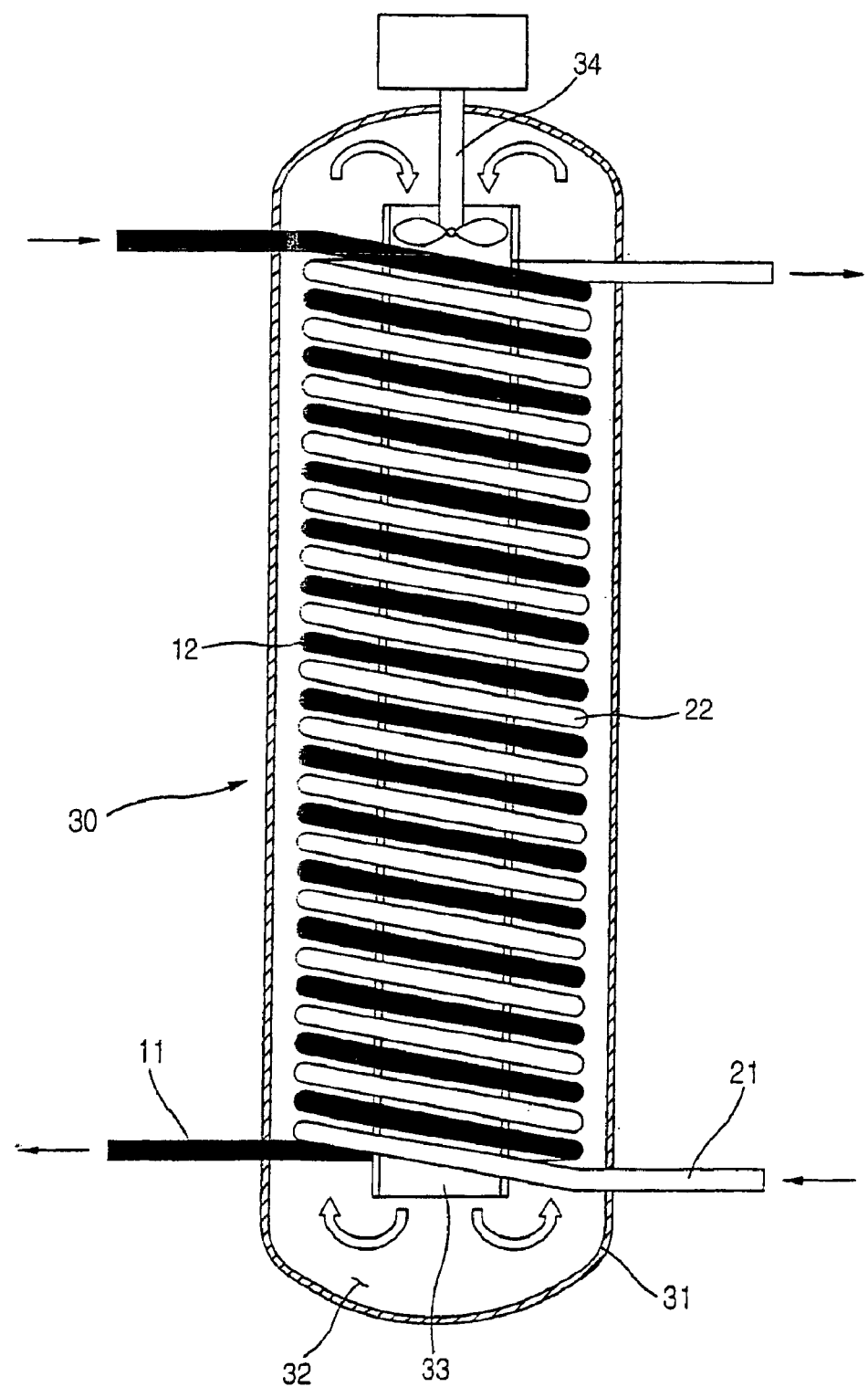
FIG. 3 is an enlarged longitudinal sectional view of the steam generator of FIG. 2.

FIG. 3 is an enlarged longitudinal sectional view of the steam generator 30 of FIG. 2.

The heat transfer tubes 12 and 22 are alternately wound around the flow channel 33 in the steam generator 30. The intermediate fluid 32 filled in the container 31 is forcibly circulated by means of a circulation pump 34 installed in the flow channel 33. The forced circulation of the intermediate fluid 32 is carried out between the coiled high temperature heat transfer tubes 12 and the coiled low temperature heat transfer tubes 22. Consequently, the convective heat transfer coefficient is improved in the steam generator 30, and thus the heat transfer efficiency of the steam generator is improved.

Specifically, the intermediate fluid 32 flows downward through the flow channel 33 by means of the circulation pump 34, and then flows upward along the outer circumference of the flow channel 33. At this time, the intermediate fluid 32 passes by the coiled high temperature heat transfer tubes 12 and the coiled low temperature heat transfer tubes 22 so that heat transfer is effectively carried out between the coiled high temperature heat transfer tubes 12 and the coiled low temperature heat transfer tubes 22. Subsequently, the intermediate fluid 32 is introduced into the upper opening of the flow channel 32 so that it is forcibly circulated by means of the circulation pump 34. The aforesaid closed circulation is repeated.

From the above description, it is easily understood that the intermediate fluid 32 is forcibly circulated in the steam generator 30 to improve its convective heat transfer efficiency and that the coiled high temperature heat transfer tubes 12 and the coiled low temperature heat transfer tubes 22 are alternately arranged in the steam generator 30 to improve the heat transfer efficiency of the steam generator 30.

Now, the heat transfer characteristics of the steam generator 30 will be described with reference to FIG. 4, which is a temperature distribution graph showing analysis results of the steam generator according to the first preferred embodiment of the present invention.

Figure 4:
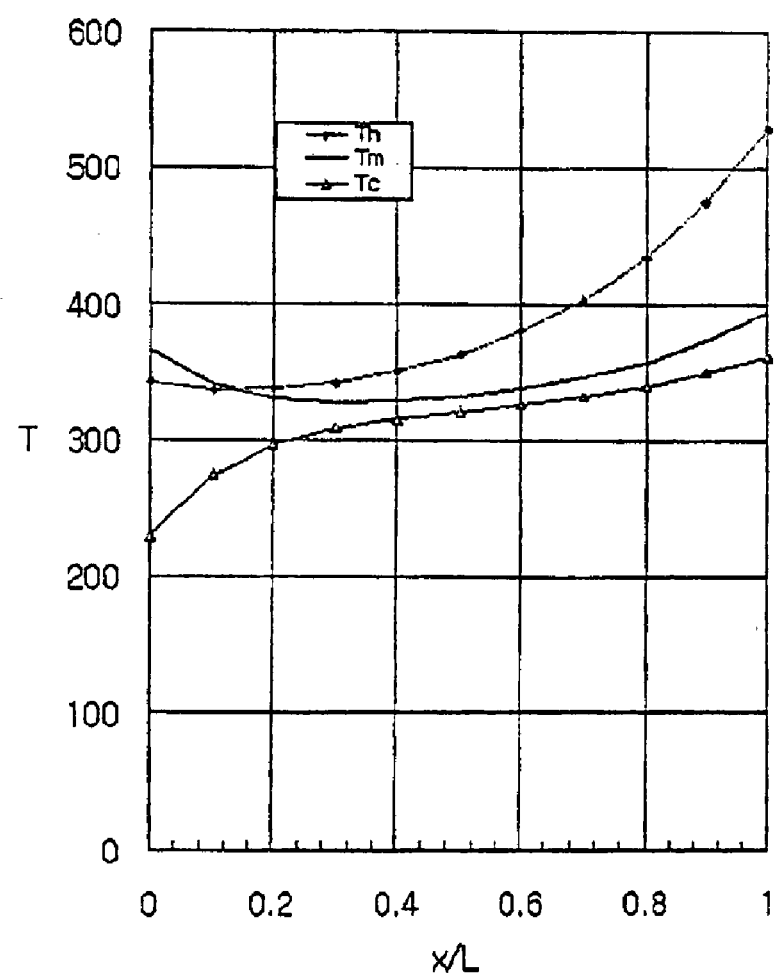
FIG. 4 is a temperature distribution graph showing analysis results of the steam generator according to the first preferred embodiment of the present invention.

In the temperature distribution graph of FIG. 4, x/L indicates the ratio of the axial location x to the whole length L of the inside of the container, and T indicates a temperature.

Also, Th indicates the temperature of the high temperature fluid flowing through the coiled high temperature heat transfer tubes, Tm indicates the temperature of the intermediate fluid filled in the container, and Tc indicates the temperature of the coiled low temperature fluid flowing through the low temperature heat transfer tubes.

The graph of FIG. 4 shows temperature distributions of the high temperature fluid, the intermediate fluid, and the low temperature fluid at a single phase operation condition.

It can be seen from the graph that the forcibly circulating intermediate fluid alternately passes by the coiled high temperature heat transfer tubes and the coiled low temperature heat transfer tubes when it flows upward through the lower part of the flow channel, and thus convective heat transfer between the high temperature fluid and the low temperature fluid is made on the basis of change of the temperature.

Such change of the temperature is repeatedly effected by means of the closed circulation of the intermediate fluid, so that the temperature of the intermediate fluid at the bottom of the flow channel is equal to that of the intermediate fluid at the top of the flow channel. This temperature distribution feature makes, as shown in the graph, the temperature of the intermediate fluid higher than that of the high temperature fluid in the coiled high temperature heat transfer tubes at the lower part of the flow channel The temperature distribution feature described above is undesirable and results in a loss in the heat transfer efficiency and the magnitude of the loss depend on the operation condition. However, this feature is a minor aspect of the overall efficiency of the embodiment of the present invention and the overall performance comes to have a better heat transfer efficiency by the use of force circulation for the intermediate fluid and better arrangement of the heat transfer tubes as explained previously.

Figure 5:
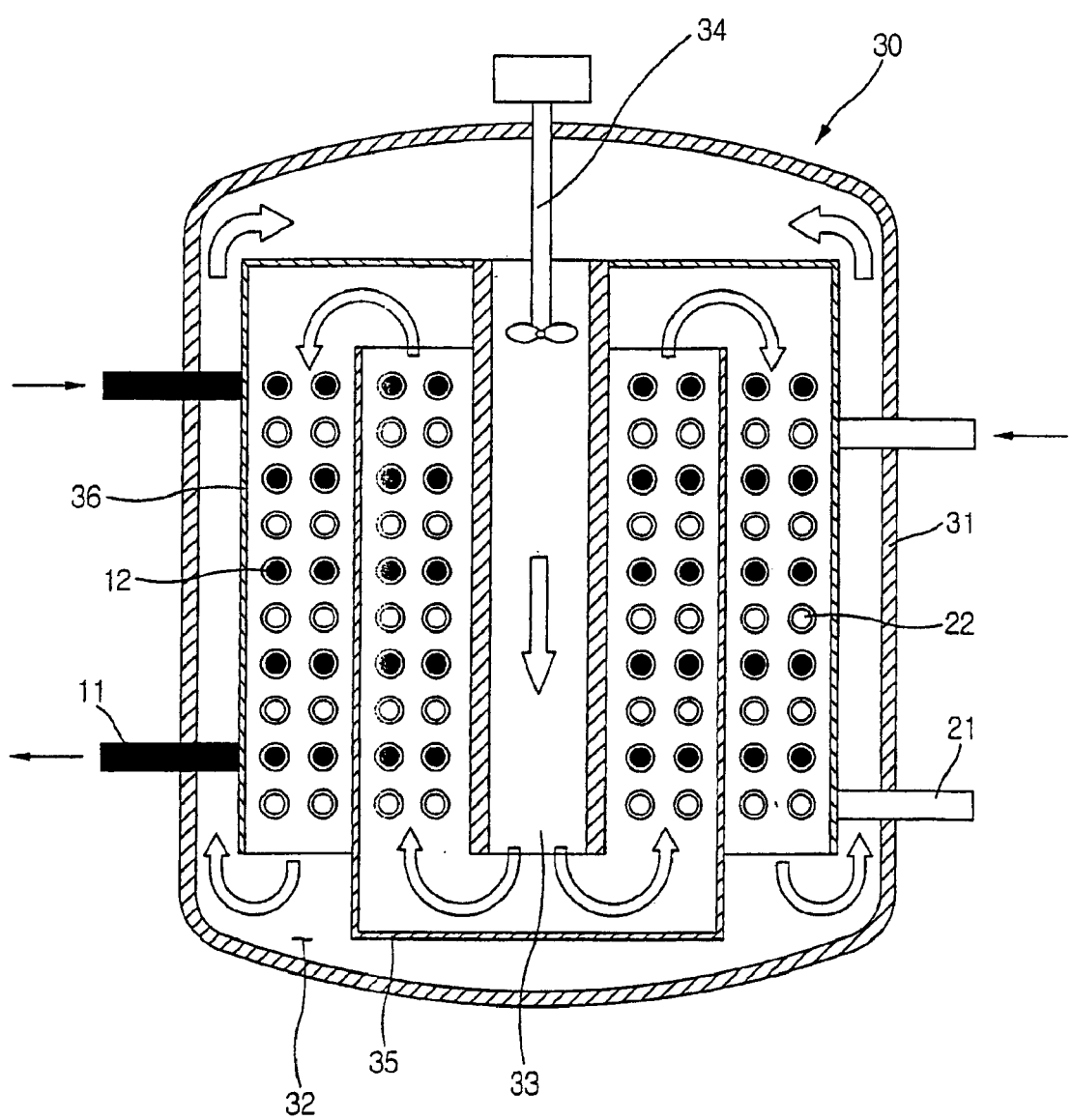
FIG. 5 is a longitudinal sectional view of a steam generator according to a second preferred embodiment of the present invention.

A steam generator according to a second preferred embodiment of the present invention is shown in FIG. 5.

As shown in FIG. 5, a steam generator 30 includes an inner cylinder 35 having an open top part and a closed bottom part. A flow channel 33 is installed in the inner cylinder 35 of the steam generator 30 in such a manner that the flow channel 33 is spaced apart from a sidewall part and the closed bottom part of the inner cylinder 35. The steam generator 30 also includes an outer cylinder 36 having a closed top part and an open bottom part. The inner cylinder 35 is installed in the outer cylinder 36 of the steam generator 30 in such a manner that the inner cylinder 35 is apart from a sidewall part and the closed top part of the outer cylinder 36. Heat transfer tubes 12 and 22 are alternately arranged in the inner cylinder 35 and the outer cylinder 36 in the longitudinal direction of the flow channel 33.

When intermediate fluid 32 is forcibly circulated by the operation of a circulation pump 34 installed in the flow channel 33, the intermediate fluid 32 having passed through the flow channel 33 also passes through a ring-shaped passage defined between the sidewall part of the inner cylinder 35 and the flow channel 33. Subsequently, the intermediate fluid 32 having passed through the cylindrical passages defined between the sidewall part of the inner cylinder 35 and the flow channel 33 also passes through another ring-shaped passage defined between the sidewall part of the inner cylinder 35 and the sidewall part of the outer cylinder 36. The intermediate fluid 32 having passed through the ring-shaped passage defined between the sidewall part of the inner cylinder 35 and the sidewall part of the outer cylinder 36 flows upward to the upper part of the flow channel 33. The aforesaid circulation of the intermediate fluid 32 is repeated. By means of the circulation of the intermediate fluid 32, convective heat transfer is increased between the heat transfer tubes 12 and 22 alternately installed in the inner and outer cylinders 35 and 36 to improve the heat transfer efficiency of the steam generator 30.

By configuring the flow path for the intermediate flow described above, the intermediate fluid temperature comes to change gradually and the undesirable feature in the temperature distribution explained in the first embodiment of the invention can be avoided. It means there is no loss of heat transfer efficiency in this embodiment. Consequently, the heat transfer is effectively accomplished.

As described above, the steam generator 30 is partitioned into several sections by the inner and outer cylinders 35 and 36 installed in the steam generator 30, and the heat transfer tubes 12 and 22 are alternately arranged in the sections, so that the intermediate fluid 32 sequentially passes through the sections of the steam generator 30. With this construction of the steam generator 30, convective heat transfer is increased between the heat transfer tubes 12 and 22.

Now, the heat transfer characteristics of the steam generator 30 will be described with reference to FIGS. 6a and 6b, which are temperature distribution graphs showing analysis results for the second preferred embodiment of the present invention.

Figure 6A:
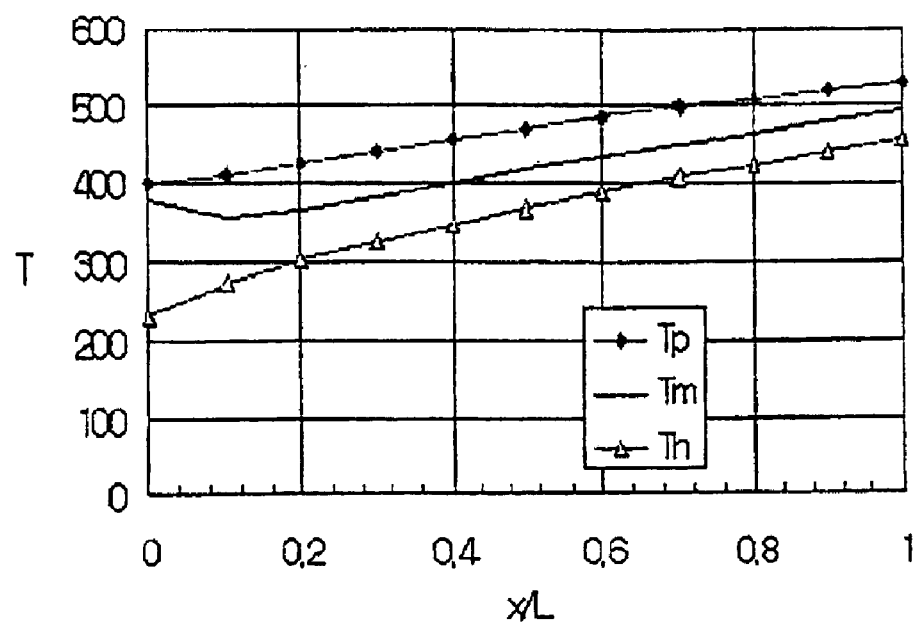
FIGS. 6a and 6b are temperature distribution graphs showing analysis results of the steam generator according to the second preferred embodiment of the present invention, respectively.
Figure 6B:
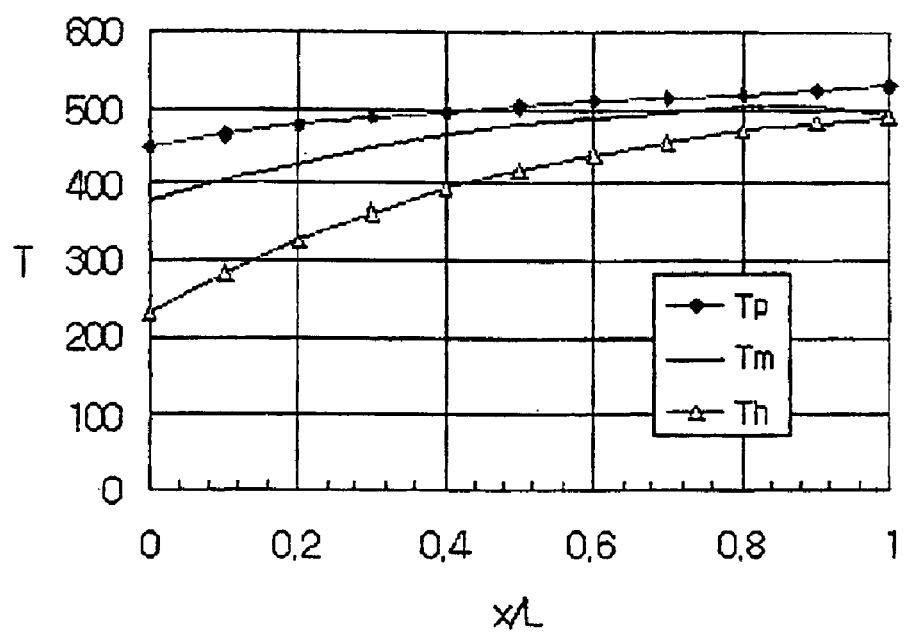

FIG. 6a shows the temperature distribution of the three fluids for the inner cylinder section where the intermediate fluid flows upward, and FIG. 6b shows the temperature distribution for the outer cylinder section where the intermediate fluid flows downward.

In the temperature distribution graphs of FIGS. 6a and 6b, x/L indicates the ratio of the axial location x to the whole length L of the heat transfer tube bundle region in the container. x/L=0 and 1 mean the bottom and top, respectively. T indicates the temperature.

Also, Tp indicates the temperature of the high temperature fluid flowing through the coiled high temperature heat transfer tubes, Tm indicates the temperature of the intermediate fluid filled in the container, and Th indicates the temperature of the low temperature fluid flowing through the coiled low temperature heat transfer tubes.

The graphs of FIGS. 6a and 6b show temperature changes of the high temperature fluid, the intermediate fluid, and the low temperature fluid at a single phase operation condition.

It can be seen from the graphs that the temperature of the intermediate fluid maintains the same value at the point where it enters the inner cylinder and also at the point where it leaves the outer cylinder, since the intermediate fluid is repeatedly circulated in the steam generator.

It can be also seen from the graphs that the heat transfer is effectively accomplished since the temperature of the intermediate fluid is between the temperature of the high temperature fluid and the temperature of the low temperature fluid.

Figure 7:
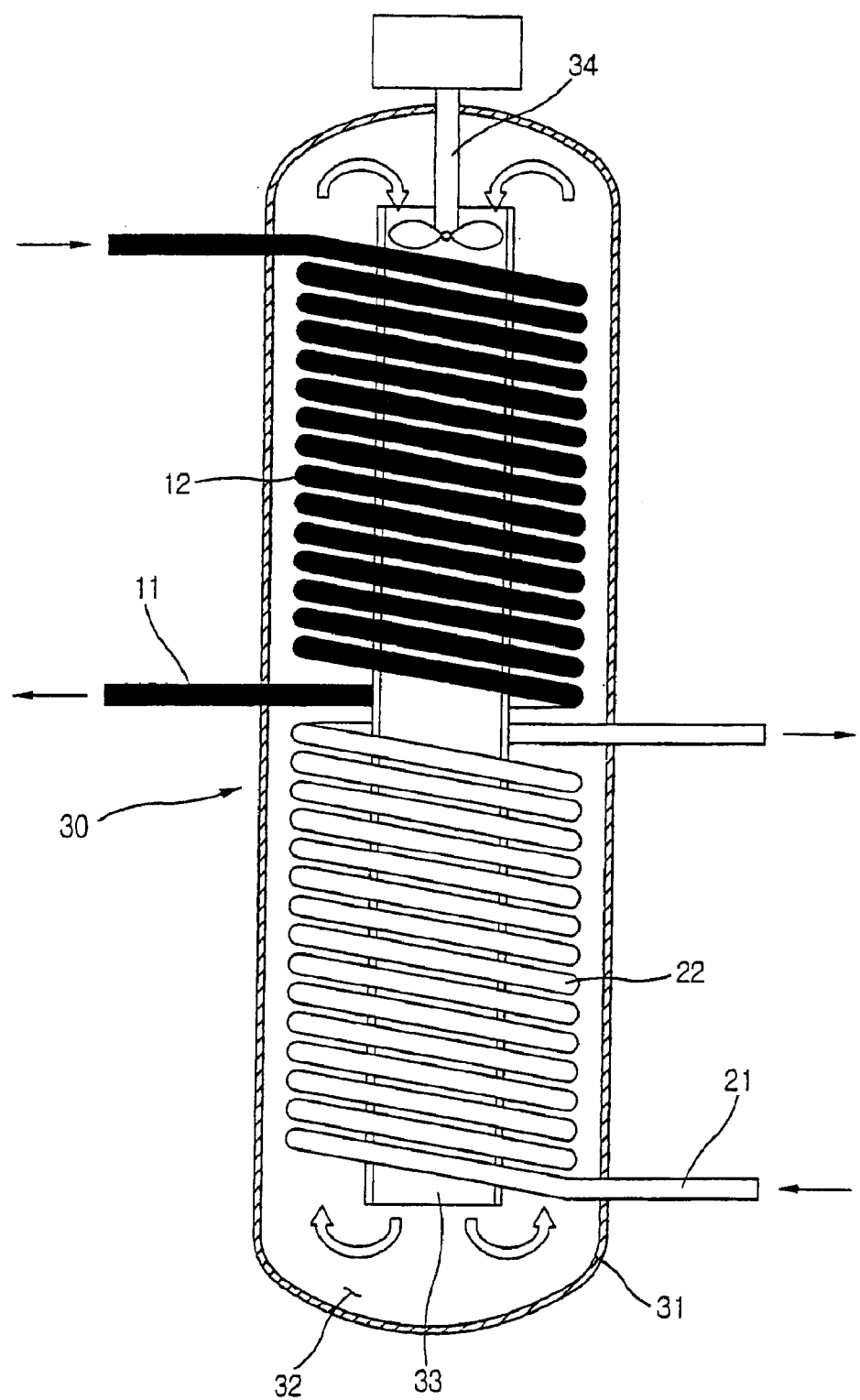
FIG. 7 is a longitudinal sectional view of a steam generator according to a third preferred embodiment of the present invention.

A steam generator according to a third preferred embodiment of the present invention is shown in FIG. 7.

As shown in FIG. 7, coiled high temperature heat transfer tubes 12, which are connected to a high temperature piping 11, are wound around a flow channel 33 of a steam generator 30 at the upper part of the flow channel 33. On the other hand, coiled low temperature heat transfer tubes 22, which are connected to a low temperature piping 21, are also wound around the flow channel 33 of the steam generator 30 at the lower part of the flow channel 33. That is to say, the coiled high temperature heat transfer tubes 12 and the coiled low temperature heat transfer tubes 22 are separately wound around the flow channel 33 of the steam generator 30 in such a manner that the coiled high temperature heat transfer tubes 12 are installed above the coiled low temperature heat transfer tubes 22.

Such separate arrangement of the coiled heat transfer tubes 12 and 22 prevents the undesirable temperature distribution mentioned in the first embodiment of the present invention.

Also this separate arrangement makes it possible to select the flow directions of hot fluid and cold fluid independently from each other and also from the intermediate fluid flow direction, and the configuration of the counter-flow heat exchanger which has the best heat transfer efficiency can be achieved for both of the heat transfer between the hot fluid and intermediate fluid and that between the intermediate fluid and cold fluid. The result is that the heat transfer efficiency is improved.

As mentioned above, the heat transfer efficiency of the steam generator 30 is improved since the coiled high temperature heat transfer tubes 12 and the coiled low temperature heat transfer tubes 22 are separately arranged apart from each other and the intermediate fluid 32 is forcibly circulated through the coiled high temperature heat transfer tubes 12 and the coiled low temperature heat transfer tubes 22.

Now, the heat transfer characteristics of the steam generator 30 will be described with reference to FIG. 8, which is a temperature distribution graph showing analysis results for the steam generator of the third preferred embodiment of the present invention at a single phase operation condition.

Figure 8:
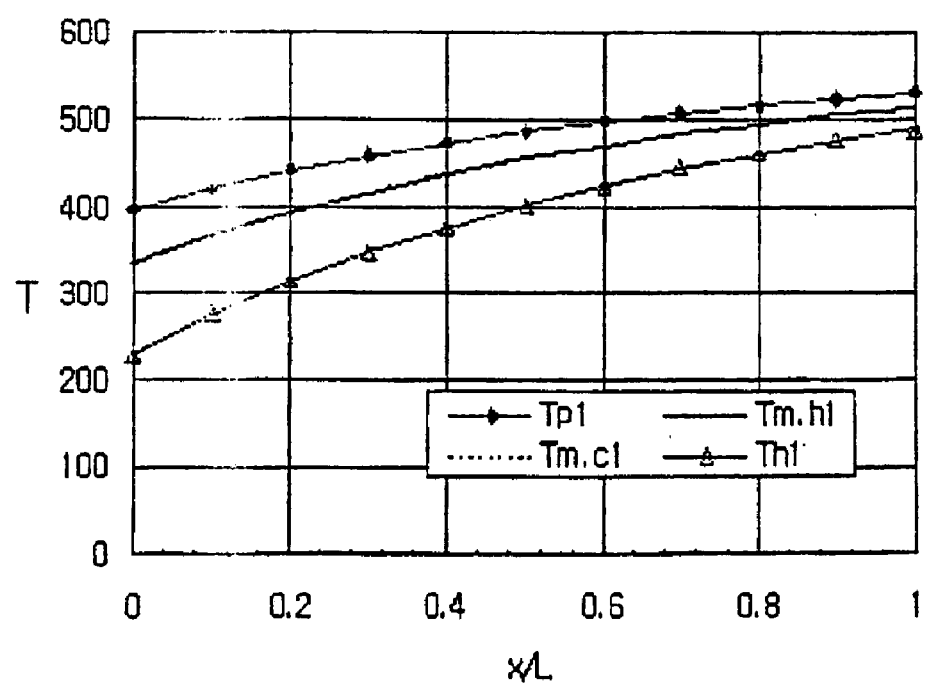
FIG. 8 is a temperature distribution graph showing analysis results of the steam generator according to the third preferred embodiment of the present invention.
Figure 9:
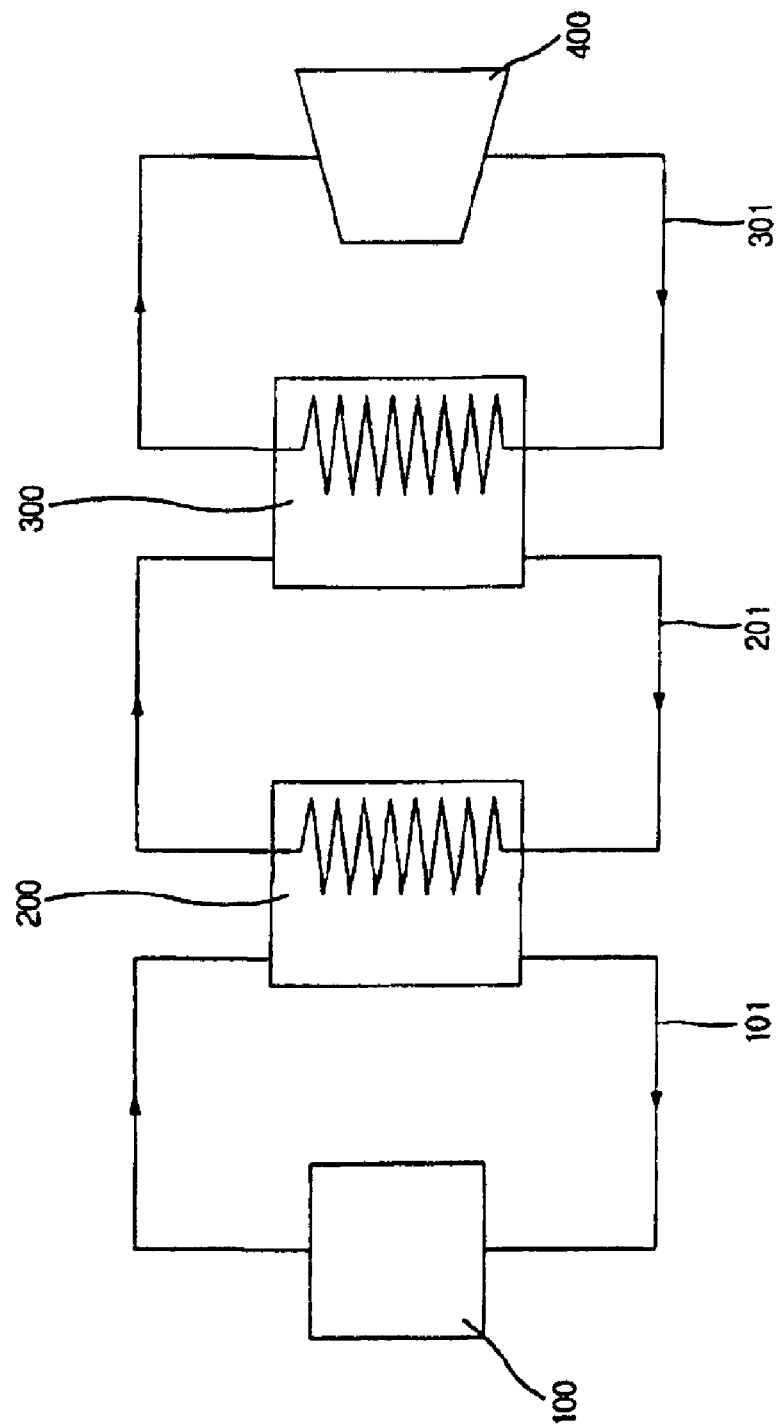
FIG. 9 is a schematic diagram of a conventional liquid metal reactor.
Figure 10:
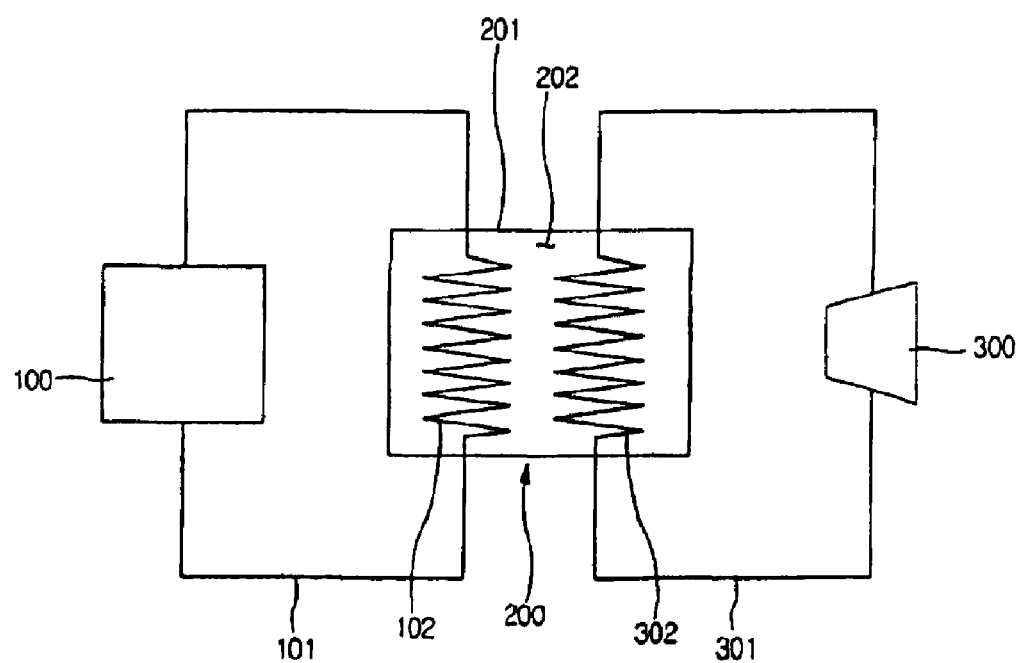
FIG. 10 is a schematic diagram of another conventional liquid metal reactor.

In the temperature distribution graphs of FIG. 8, x/L indicates the ratio of the axial location x to the whole length L of the heat transfer tube bundle region in the container. x/L=0 and 1 mean the bottom and top, respectively. T indicates the temperature.

Also, Tp1 indicates the temperature of the high temperature fluid flowing through the coiled high temperature heat transfer tubes, Tm.h1 indicates the temperature of the intermediate fluid flowing through the section where the coiled high temperature heat transfer tubes are arranged, Tm.c1 indicates the temperature of the intermediate fluid flowing through the section where the coiled low temperature heat transfer tubes are arranged, and Th1 indicates the temperature of the low temperature fluid flowing through the coiled low temperature heat transfer tubes.

It can be seen from the graph that the heat transfer is effectively accomplished since the temperature of the intermediate fluid is between the temperature of the high temperature fluid and the temperature of the low temperature fluid.

For the accident of the violent sodium-water reaction to occur, sodium and water should be able to contact each other. It means, in all of the embodiments of the present invention described above, both heat transfer tubes for the hot fluid of sodium and cold fluid of water should get broken and leak at the same time. However, the possibility of simultaneous brakeage of the coiled high and low temperature heat transfer tubes is actually extremely low.

The practically possible scenario of the accident in the present invention is that a breakage occurs at one of the hot and cold fluid tubes and the steam generator operation is continued without knowing the breakage and another breakage is made at the other fluid tubes. The first breakage, however, can be easily detected by the means of the current detection technique such as monitoring the pressure change inside the container 31. Therefore, the possibility of the sodium-water reaction accident can be practically eliminated and the safety of a liquid metal reactor can be increased.

As apparent from the above description, the present invention provides a steam generator for a liquid metal reactor having intermediate fluid forcibly circulated therein and structurally improved coiled heat transfer tubes installed therein, and a heat transfer method of such a steam generator, whereby an accident of the sodium-water reaction is practically prevented and heat transfer efficiency is improved.

Furthermore, the present invention eliminates the need for a very expensive immediate heat transport system and a system for mitigating the sodium water reaction accident, which are used in the conventional liquid metal reactor, whereby the construction cost of a liquid metal reactor is considerably reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A heat transfer method of a steam generator for a liquid metal reactor comprising a reactor core, a steam generator, and a turbine, the heat transfer method comprising:
   containing heat transfer tubes for a hot fluid, a cold fluid and an intermediate fluid;
   disposing a flow channel entirely within the steam generator; and
   circulating the intermediate fluid by forced circulation through the flow channel,
   wherein the flow channel forms a closed flow circuit for the intermediate fluid by means of operation of a circulation pump installed in the flow channel.

2. A steam generator for a liquid metal reactor, comprising:
   coiled heat transfer tubes having a high temperature fluid of liquid metal circulated therein, the coiled heat transfer tubes being eventually connected to a reactor core;
   coiled heat transfer tubes having a low temperature fluid of water circulated therein, the coiled heat transfer tubes being eventually connected to a turbine; and
   a container for accommodating the coiled heat transfer tubes for the high temperature fluid and the coiled heat transfer tubes for the low temperature fluid, the container having an intermediate fluid filled therein,
   wherein the container has a flow channel defined therein, and a circulation pump installed in the flow channel.

3. The steam generator as set forth in claim 2, wherein the coiled heat transfer tubes for the high temperature fluid and the coiled heat transfer tubes for the low temperature fluid are alternately wound around the flow channel.

4. The steam generator as set forth in claim 2, further comprising:
   an inner cylinder having an open top part and a closed bottom part, the inner cylinder surrounding the flow channel while being apart from the flow channel; and
   an outer cylinder having a closed top part and an open bottom part, the outer cylinder surrounding the inner cylinder while being apart from the inner cylinder,
   wherein the coiled heat transfer tubes for the high temperature fluid and the coiled heat transfer tubes for the low temperature fluid are alternately arranged in the inner cylinder and the outer cylinder in the longitudinal and/or radial direction of the flow channel.

5. The steam generator as set forth in claim 2, wherein the coiled heat transfer tubes for the high temperature fluid and the coiled heat transfer tubes for the low temperature fluid are separately wound around the flow channel.

6. The steam generator as set forth in claim 2, wherein the intermediate fluid performs a heat transfer from the coiled heat transfer tubes having the high temperature fluid to the coiled heat transfer tubes having the low temperature fluid,
   wherein the intermediate fluid is circulated through the flow channel by the circulation pump to perform heat transfer.

7. The steam generator as set forth in claim 6, wherein the flow channel is disposed entirely within the steam generator.

8. The steam generator as set forth in claim 2, wherein the intermediate fluid is liquid metal.

9. The method as set forth in claim 1, wherein the intermediate fluid is liquid metal chemically stable to the hot fluid and the cold fluid.

* * * * *